United States Patent
Prasad et al.

[11] Patent Number: 6,017,646
[45] Date of Patent: Jan. 25, 2000

[54] PROCESS INTEGRATING A SOLID OXIDE FUEL CELL AND AN ION TRANSPORT REACTOR

[75] Inventors: Ravi Prasad, East Amherst; Christian Friedrich Gottzmann, Clarence; Nitin Ramesh Keskar, Grand Island, all of N.Y.

[73] Assignee: Praxair Technology, Inc., Danbury, Conn.

[21] Appl. No.: 09/089,513

[22] Filed: Jun. 3, 1998

[51] Int. Cl.[7] ............................ H01M 8/04; H01M 8/06
[52] U.S. Cl. .................... 429/13; 429/14; 429/15; 429/17; 429/19
[58] Field of Search ............................ 429/13, 14, 15, 429/17, 19, 30

[56] References Cited

U.S. PATENT DOCUMENTS

| | | | |
|---|---|---|---|
| 3,847,672 | 11/1974 | Trocciola et al. | 136/86 |
| 4,490,444 | 12/1984 | Isenberg | 429/31 |
| 4,728,584 | 3/1988 | Isenberg | 429/31 |
| 4,793,904 | 12/1988 | Mazanec et al. | 204/59 |
| 5,143,800 | 9/1992 | George et al. | 429/20 |
| 5,200,279 | 4/1993 | Draper et al. | 429/30 |
| 5,306,411 | 4/1994 | Mazanec et al. | 204/265 |
| 5,413,879 | 5/1995 | Domeracki et al. | 429/30 |
| 5,516,359 | 5/1996 | Kang et al. | 95/14 |
| 5,562,754 | 10/1996 | Kang et al. | 95/54 |
| 5,565,017 | 10/1996 | Kang et al. | 95/14 |
| 5,702,999 | 12/1997 | Mazanec et al. | 501/152 |
| 5,712,220 | 1/1998 | Carolan et al. | 502/400 |
| 5,733,435 | 3/1998 | Prasad et al. | 205/765 |
| 5,852,925 | 12/1998 | Prasad et al. | 60/39.02 |

OTHER PUBLICATIONS

Bevc et al., "SureCELL Integrated Solid Oxide Fuel Cell Power Plants for Distributed Power Applications", Power-Gen 1995, pp. 1–18 (1995).

*Primary Examiner*—Arun S. Phasge
*Attorney, Agent, or Firm*—Bharat C. Gandhi

[57] ABSTRACT

An integrated system utilizing a solid oxide fuel cell and at least one ion transport reactor to generate electric power and a product gas by delivering an oxygen-containing gas, typically air, to a first cathode side of the solid oxide fuel cell and delivering a gaseous fuel to a first anode side. Oxygen ions are transported through a membrane in the fuel cell to the first anode side and exothermally react with the gaseous fuel to generate electric power and heat. The heat and oxygen transport produces a higher-temperature, reduced-oxygen-content gaseous retentate stream exiting the cathode side of the solid oxide fuel cell which is delivered to a first ion transport reactor where a substantial portion of the residual oxygen is transported through an oxygen selective ion transport membrane. A product gas stream is then recovered.

22 Claims, 7 Drawing Sheets

PROCESS INTEGRATING A SOLID OXIDE FUEL CELL AND AN ION TRANSPORT REACTOR

FIELD OF THE INVENTION

This invention relates to a process for the co-generation of power and at least one product gas. More particularly, the process integrates a solid oxide fuel cell and an ion transport reactor.

BACKGROUND OF THE INVENTION

Electrical power is traditionally generated by a thermodynamic process. Heat, for example, may be generated by burning oil in a boiler to superheat pressurized water. The superheated water is expanded into pressurized steam that mechanically rotates a turbine. Rotation of the rotor windings of an electric generator rotor connected to the turbine through an appropriate magnetic field generates electrical power.

Conventional electrical power generation uses a thermal/mechanical process the efficiency of which is limited by the Carnot cycle. The Carnot cycle mandates that, even under ideal conditions, a heat engine cannot convert all the heat energy supplied to it into mechanical energy, and therefore a significant portion of the heat energy is rejected. In the Carnot cycle, an engine accepts heat energy from a high temperature source, converts part of the heat energy into mechanical work, and rejects the remainder of the heat energy to a low temperature heat sink. The rejected heat energy causes a loss in efficiency.

A different process for generating electricity utilizes a solid oxide fuel cell. Electrical power results from the direct conversion of the energy released by a chemical reaction into electrical power, rather than a thermal/mechanical process. As a result, solid oxide fuel cells are not limited in efficiency by the Carnot cycle and highly efficient electrical power generation is theoretically possible.

One solid oxide fuel cell is disclosed in U.S. Pat. No. 5,413,879 to Domeracki et al. that is incorporated by reference in its entirety herein. The patent discloses a solid oxide fuel cell having a gas tight ceramic membrane that separates an air chamber from a fuel chamber. The ceramic membrane is typically a three layer composite having a gas tight core portion formed from a ceramic membrane material, such as yttria-stabilize zirconia, that selectively transports oxygen ions by diffusion. A portion of the surface of the ceramic membrane in contact with air is coated with an electrode that may be made of strontium-doped lanthanum manganite. A portion of the opposing surface of the ceramic membrane in contact with fuel is a fuel electrode that may be a nickel-zirconia cermet. Interconnects are provided on both electrodes which permit connecting several electrical cells in series or parallel and withdraw an electric current generated by the ion flux. Suitable solid fuel cells are disclosed in U.S. Pat. No. 4,490,444 (Isenberg) and U.S. Pat. No. 4,728,584 (Isenberg), each of which is hereby incorporated by reference in its entirety.

Hot air contacts the air electrode and oxygen is separated from the air by ion transport through the ceramic membrane to the surface of the fuel electrode. A gaseous fuel, typically a light hydrocarbon such as natural gas or carbon monoxide, contacts the fuel electrode surface and exothermally reacts with the oxygen ions to produce electricity and heat as the result of internal losses. Exiting the fuel cell are a hot partially oxygen depleted gas from the cathode or retentate side and reaction or combustion products from the anode or permeate side.

Electric power generating systems using solid oxide fuel cells are limited in attainable efficiencies due to several factors including: (1) internal electrical losses primarily in the electrodes, (2) the high temperature in the range of about 700° C. to about 1,000° C. to which air must be heated; and (3) the fact that only a portion of the oxygen contained within the hot air, typically on the order of between 20% to 30% by volume of the oxygen available, is transported through the ceramic membrane for reaction with the gaseous fuel. The remainder of the oxygen is discharged in the retentate stream exiting the air chamber. Part of the energy added to the retentate and permeate streams is lost as the result of pressure drop and limited effectiveness of optional recuperative heat exchangers.

U.S. Pat. No. 5,413,879 (Domeracki) discloses combining the reaction products from chemical reactions in the fuel chamber with the hot gas retentate from the air chamber and reacting it with additional fuel in a combustor to further elevate the temperature of the mixture. The hot mixture heats a compressed gas which is used to drive a turbine.

Several types of ion transport membranes are disclosed in U.S. Pat. No. 5,733,435 (Prassad et al.) For membranes that exhibit only ionic conductivity, external electrodes are placed on the surfaces of the membrane and the electron current is returned by an external circuit. In mixed conducting membranes, electrons are transported to the cathode side internally, thus completing a circuit and obviating the need for external electrodes in a pressure-driven mode. Dual phase conductors, in which an ionic conductor is mixed with an electronic conductor, may also be used for the same application.

U.S. Pat. No. 4,793,904 to Mazanec et al., that is incorporated by reference in its entirety herein, discloses an ion transport membrane coated on both sides with an electrically conductive layer. An oxygen-containing gas contacts one side of the membrane. Oxygen ions are transported through the membrane to the other side where the ions react with methane or similar hydrocarbons to form syngas. The electrons released by the oxygen ions flow from the conductive layer to external wires and may be utilized to generate electricity.

In a mixed conductor type membrane, the membrane has the ability to selectively transport both oxygen ions and electrons. It is not necessary to provide an external electric field for the removal of the electrons released by the oxygen ions. U.S. Pat. No. 5,306,411 to Mazanec et al., that is incorporated by reference in its entirety herein, discloses application of mixed conductor and dual phase conductor membranes.

The membrane comprises either "single phase" mixed metal oxides having a perovskite structure with both ion- and electron conductive properties or a multi-phase mixture of an electron-conductive phase and an ion conductive phase. The oxygen ion transport is disclosed as being useful to form syngas and to remediate flue gases such as $NO_x$ and $SO_x$.

U.S. Pat. No. 5,516,359 to Kang et al. discloses a ceramic ion transport membrane integrated with a high temperature process in which heat is utilized effectively for the operation of both the membrane and the high temperature process. Hot compressed air contacts with an oxygen selective ion transport membrane and a portion of the oxygen contained within the air is transported through the membrane and removed as a product gas. The oxygen depleted residual gas is combined with a gaseous fuel and reacted to generate a high temperature gas useful to drive a turbine that typically drives an air compressor and a generator for electrical power generation.

There remains, however, a need for a process that integrates ion transport reactors with the more efficient solid oxide fuel cell for the generation of one or more product gases and electric power to realize an improvement in efficiency.

OBJECTS OF THE INVENTION

It is therefore an object of the invention to provide a process for the generation of both electric power and one or more product gases including oxygen, nitrogen and carbon dioxide singly or in combination.

It is a further object of the invention that such process efficiently integrates a solid oxide fuel cell with an ion transport reactor. This objective is aided by the fact that solid oxide fuel cells and oxygen ion transport membranes have similar operating temperatures.

Yet another object of the invention is to utilize the streams exiting the solid oxide fuel cell as feed streams to the ion transport reactor and to utilize the exiting stream from the retentate side and optionally also from the permeate side of the oxygen selective ion transport membrane to drive a turbine.

It is another object of the invention to utilize the heat generated on the anode side of the fuel cell, as the result of inefficient conversion of chemical energy into electrical energy, to heat the feed gas directed to the cathode of the oxygen transport separator to membrane operating temperature.

It is yet another object of the invention to place the anode side of the fuel cell in series with anode side of a reactively purged ion transport membrane and add excess fuel to the fuel cell anode feed to be available as reactant in the purge stream and thereby raise the efficiency of the fuel cell energy conversion.

SUMMARY OF THE INVENTION

This invention comprises a process for the generation of electric power and one or more product gases from an oxygen-containing gas and a gaseous fuel. A solid oxide fuel cell is provided having a first cathode or retentate side and a first anode or permeate side. A first ion transport reactor is provided having an oxygen selective ion transport membrane disposed therein, the membrane having a second cathode or retentate side and a second anode or permeate side. The oxygen-containing gas is contacted with the first cathode side and a gaseous fuel is contacted with the first anode side causing a first oxygen portion to be transported from the first cathode side to the first anode side as oxygen ions. The oxygen ions react with the gaseous fuel and generate heat and a flow of electrons that is recovered as electric power. A retentate gas with remaining oxygen is directed from the first cathode side of the solid oxide fuel cell to the second cathode side of the first ion transport reactor causing a second oxygen portion to be transported through the ceramic membrane to the second anode side. At least one product gas is recovered from one or more of the respective first and second anode and cathode sides.

In a preferred embodiment, the oxygen-containing gas is air and is compressed prior to contacting the first cathode side. Oxygen is recovered from the second anode side. A recuperative heat exchanger transfers heat from exothermic reaction outputs to said oxygen-containing gas and to said first gaseous fuel upstream of said solid oxide fuel cell.

In another preferred embodiment the heat generated in the fuel cell, as the result of inefficient conversion of chemical to electrical energy of the anode side reaction, furnishes at least part of the energy required to heat the air stream to oxygen transport membrane operating temperature. Steam is used as a sweep gas for the second anode side and the second anode side permeate comprises a mixture of steam and oxygen that is utilized for coal gasification. A purge gas is contacted with the second anode side and a low oxygen content nitrogen gas is recovered as product gas.

In yet another preferred embodiment the reaction products generated on the anode side of the fuel cell are used to purge the anode of the oxygen transport separator. A second reactively purged ion transport reactor is disposed between the solid oxide fuel cell and the first ion transport reactor.

In a preferred embodiment the fuel required in a reactively purged oxygen transport reactor is added to the fuel feed to the fuel cell and the anode sides of the fuel cell and said ion transport reactor are placed in series, thereby increasing the efficiency of the fuel cell. Either nitrogen product gas under pressure or electric power generated by the solid oxide fuel cell is used to drive the compressor that compresses the oxygen-containing gas.

BRIEF DESCRIPTION OF THE DRAWINGS

Other objects, features and advantages will occur to those skilled in the art from the following description of preferred embodiments and the accompanying drawings, in which.

DETAILED DESCRIPTION OF THE INVENTION

This invention may be accomplished by integrating a solid oxide fuel cell with a ceramic membrane ion transport reactor. Preferably, a turbine is operated with one or more streams exiting the integrated system. Compressed air is delivered to the solid oxide fuel cell where a first portion of the oxygen contained within the air is transported through a ceramic membrane and exothermally reacts with a fuel gas to generate combustion products and electricity. A reduced oxygen content retentate stream is discharged from the solid oxide fuel cell cathode to the cathode of an ion transport reactor that has an oxygen selective ion transport membrane. A second portion of the oxygen contained within the air is transported through the oxygen selective ion transport membrane and may be recovered as a product gas or utilized in downstream reactions. The retentate from the ion transport membrane, while substantially oxygen depleted, may still contain sufficient oxygen so that it is mixed in some embodiments with a gaseous fuel and combusted to generate a high temperature gas for driving a turbine. Alternatively, nitrogen may be recovered from the oxygen depleted stream.

Figure 1:
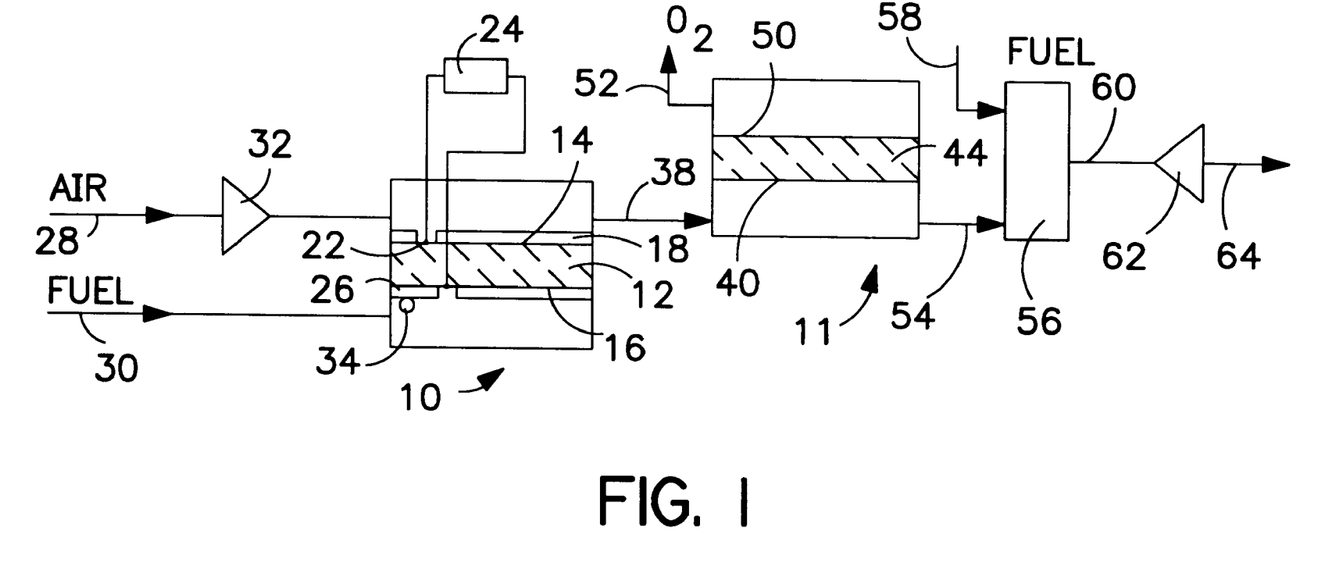
FIG. 1 schematically illustrates a solid oxide fuel cell integrated with a ceramic membrane ion transport reactor in accordance with the invention.

FIG. 1 schematically illustrates a process integrating a solid oxide fuel cell 10 and a first ion transport reactor 11 in accordance with the invention. The solid oxide fuel cell 10 has a ceramic membrane 12 that divides the solid oxide fuel cell 10 into a first cathode side 14 and a first anode side 16.

The ceramic membrane 12 is oxygen selective and transports oxygen ions from the first cathode side 14 to the first anode side 16. One suitable material for the ceramic membrane 12 is ytria stabilized zirconia. A porous air electrode 18 covers substantially all of the first cathode side 14. One suitable material for the air electrode 18 is strontium doped lanthanum manganite. A first interconnect portion 22 is not coated with the air electrode 18 and is electrically connected to a load 24. Oxygen ions are transported through the ceramic membrane 12 to the first anode side 16 that is coated with a porous fuel electrode 26 except for an electrical interconnect portion. Fuel electrode 26 that may be made of any material that effectively minimizes polarization losses and is stable in the reducing atmosphere such as a nickel-zirconia cermets.

An oxygen-containing gas feed 28 is delivered to the first cathode side 14 and a gaseous fuel 30 is delivered to the first anode side 16.

The oxygen-containing gas feed 28, typically air, is delivered to the cathode side of the fuel cell at a temperature somewhat below (typically 200 to 700° C. below) the operating temperature of the fuel cell to act as heat sink for the heat generated by the fuel cell reaction. The operating temperature of the solid oxide fuel cell 10 is typically at a temperature above 500° C. and preferably in the range of from about 700° C. to about 1,000° C. Oxygen molecules in the feed air are dissociated to elemental oxygen on contact with air electrode 18. "Elemental oxygen" refers to oxygen that is uncombined with other elements of the periodic table. While typically in diatomic form, the term elemental oxygen as used herein is intended to encompass single oxygen atoms, triatomic ozone and other forms uncombined with other elements. Air is preferred as the oxygen-containing gas feed 28.

The oxygen-containing gas feed 28 is preferably compressed, typically to a pressure of between 30 and 300 psia, and more preferably to a pressure of between 100 to 230 psia, by compressor 32. The compressed oxygen-containing gas feed is then preferably warmed to an intermediate temperature of between about 300° C. and about 800° C., and more preferably to a temperature of from about 500° C. to about 700° C., and then delivered to the first cathode side 14. The final heating of the feed air to fuel cell and oxygen transport membrane operating temperatures occurs within the fuel cell by virtue of the portion of the chemical energy of the anode side reaction which is not converted into electrical energy but is released as heat which in turn is transferred to elevate the temperature of the feed stream to the required level.

The gaseous fuel 30 is any gas or combination of gases having a constituent that exothermally reacts with elemental oxygen. The reactive constituent may be natural gas or mixtures of light hydrocarbons, methane, carbon monoxide, or synthesis gas ("syngas"). Syngas is a mixture of hydrogen and carbon monoxide with a $H_2/CO$ molar ratio of from about 0.6 to about 6. A further component of the fuel gas, which may be undesirable in the fuel cell, in some embodiments is a non-reactive diluent gas such as nitrogen, carbon dioxide or steam.

The gaseous fuel 30 is preheated to a temperature of from about 300° C. to about 900° C. and then introduced to the first anode side 16. The reactive constituents of the gaseous fuel 30 exothermally react with elemental oxygen. Electrons 34 released by the oxygen ions provide electrical power to load 24.

A portion of the oxygen contained in the oxygen-containing gas feed 28 is consumed by the reaction at the first anode side 16. A retentate stream 38 with reduced oxygen content is then conducted to a second cathode side 40 that is a portion of a first ion transport reactor 11.

The first ion transport reactor 11 has an oxygen selective ion transport membrane 44 that separates the first ion transport reactor 11 into a second cathode side 40 and a second anode side 50. By "oxygen selective" it is meant that oxygen ions are preferentially transported across the oxygen selective ion transport membrane 44, from the second cathode side 40 to the second anode side 50, over other elements, and ions thereof. The oxygen selective ion transport membrane 44 is made from inorganic oxides, typified by calcium- or yttrium-stabilized zirconia. At elevated temperatures, generally in excess of 400° C., the oxygen selective ion transport membrane 44 contains mobile oxygen-ion vacancies that provide conduction sites for the selective transport of oxygen ions through the membrane. Transport through the membrane is driven by the ratio of partial pressure of oxygen ($P_{O2}$) across the membrane: $O^{--}$ ions flow from the side with high $P_{O2}$ to the side with low $P_{O2}$. Ionization of $O_2$ to $O^{--}$ takes place at the second cathode side 40 and the ions are then transported to the second anode side 50 where $O_2$ is recoverable as a product gas.

The oxygen selective ion transport membrane 44 is formed as either a dense wall solid oxide mixed or dual phase conductor, or alternatively, as a thin film solid oxide mixed or dual phase conductor that is supported on a porous substrate. The oxygen-selective ion transport membrane 44 has a nominal thickness of under 5,000 microns and is preferably less than 1,000 microns thick.

The oxygen selective ion transport membrane 44 transports oxygen ions and electrons at the prevailing oxygen partial pressure in the temperature range of from about 450° C. to about 1200° C. when a chemical potential difference is maintained across the ion transport membrane surface caused by a ratio of oxygen partial pressures across the ion transport membrane. The oxygen ion conductivity is typically in the range of between 0.01 and 100 S/cm where S ("Siemens") is reciprocal ohms ($1/\Omega$). Suitable materials for the oxygen selective ion transport membrane include perovskites and dual phase metal-metal oxide combinations as listed in Table 2 of U.S. Pat. No. 5,733,435 which is also incorporated by reference in its entirety herein. See also the materials disclosed in U.S. Pat. No. 5,702,999 (Mazanec) and U.S. Pat. No. 5,712,220 (Carolan et al.) A material with a high ion conductivity, at least 0.5 and preferentially at least 1 S/cm at 900° C., is desired for membrane 44 since the driving force for oxygen transport will typically be small (<10°). A suitable material would be a mixture of lanthanum, strontium and cobalt oxides.

Optionally a porous catalyst layer, in some embodiment made from the same perovskite material as the material of the dense membrane layer, is added to one or both sides of the oxygen selective ion transport membrane 44 to enhance oxygen surface exchange in the chemical reactions on the surfaces. Alternatively, the surface layers of the oxygen selective ion transport membrane 44 may be doped, for example, with cobalt, to enhance surface exchange kinetics.

The first iron transport reactor 11 is operated at an elevated temperature that is sufficient to facilitate oxygen transport through the oxygen selective iron transport membrane 44. The operating temperature is at least 400° C., preferably in the range of from about 400° C. to about 1,200° C., and most preferably in the range from about 400° C. to about 1,000° C.

Approximately 30% to 60%, by volume, of the oxygen retained in the reduced oxygen gas feed output is transported through the oxygen selective ion transport membrane 44 and is recovered as oxygen product gas 52. The percentage of oxygen that can be recovered depends on the respective oxygen partial pressures at the second cathode side 40 and second anode side 50. The percentage of oxygen recovered can be enhanced by reducing the oxygen partial pressure at the second anode side 50 by the use a sweep gas at the second anode side or vacuum pumping.

Purge gases are oxygen scavenging gases such as natural gas, methane, methanol, ethanol and hydrogen. A sweep gas is a non-reactive gas that reduces the oxygen partial pressure. Suitable sweep gases include carbon dioxide and steam.

Optionally an oxygen depleted retentate stream 54 is directly expanded in a turbine 62 to generate turbine power 64 or it may be delivered first to a combustor 56 and reacted with a second gaseous fuel 58. The combustion products 60 are a high temperature gas of low oxygen content that may be used to drive the turbine 62 to generate a turbine shaft power 64.

Figure 2:
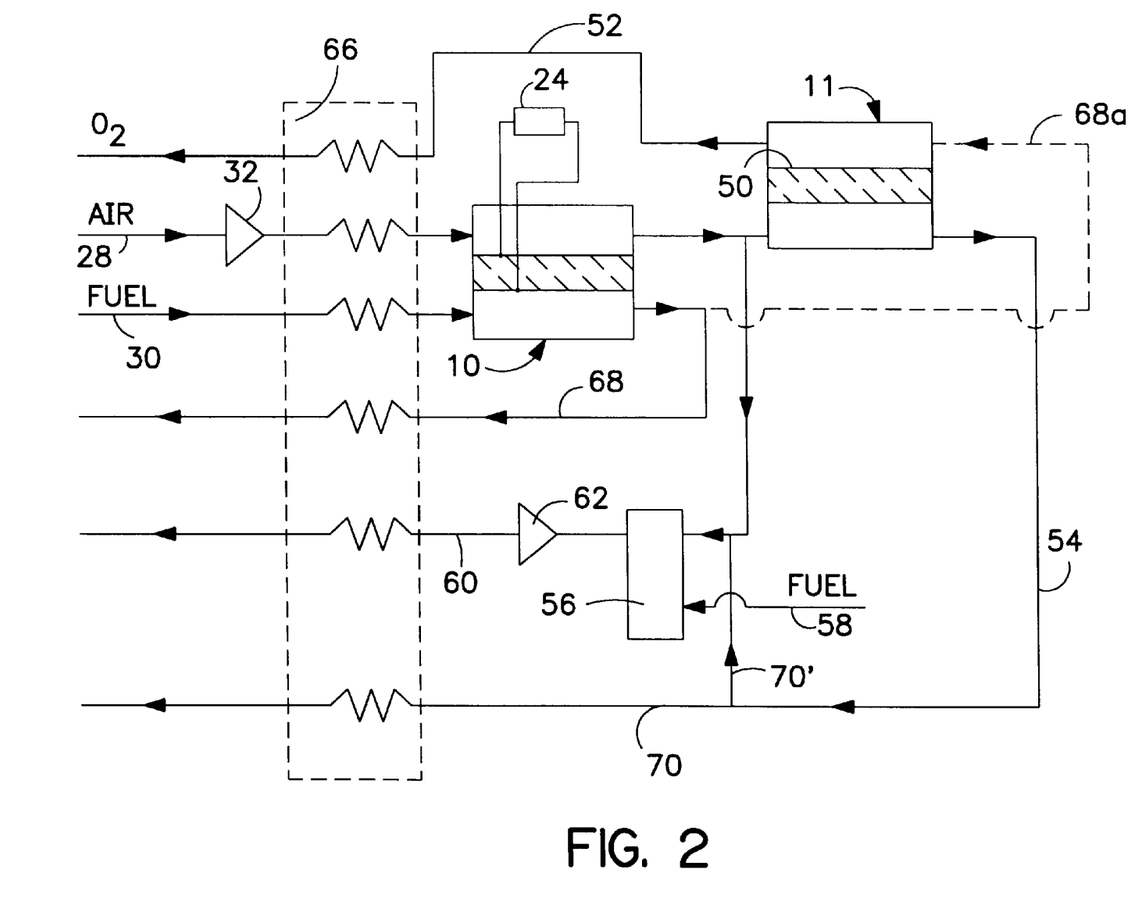
FIG. 2 schematically illustrates an integrated system for the co-production of power and oxygen.

The efficiency of the process illustrated in FIG. 1 is enhanced by the arrangement illustrated schematically in FIG. 2. A recuperative heat exchanger 66 recovers heat rejected from elevated temperature gases such as product gas 52, combustion products 68 of solid oxide fuel cell 10, and combustion products 60 of combustor 58. Optionally, the oxygen depleted output 54 bypasses combustor 56 and rejects heat to recuperative heat exchanger 66. The heat is used to raise the temperature of the oxygen-containing gas feed 28 and the gaseous fuel 30.

The combustion products 68 may be discharged after recovery of waste heat as illustrated in FIG. 2. Alternatively, the combustion products 68 are conducted to the second anode side 50 as a sweep gas, shown in phantom as arrow 68a, to enhance oxygen transport and recovery. In this alternative embodiment, the product gas 52 contains oxygen, water and carbon dioxide. After condensing out the water, a low purity oxygen stream diluted by carbon dioxide is recovered. If desired, the oxygen and carbon dioxide product gases can be separated by a downstream process such as thermal swing adsorption or polymeric membranes.

Reactive purge arrangements are disclosed in "Reactive Purge for Solid Electrolyte Membrane Gas Separation", U.S. Ser. No. 08/567,699, filed Dec. 5, 1995, now U.S. Pat. No. 5,837,125 E.P. Publ. No. 778,069, and incorporated herein by reference. Preferred configurations for ion transport modules utilizing a reactive purge are disclosed in "Solid Electrolyte Ionic Conductor Reactor Design", U.S. Ser. No. 08/848,204, filed Apr. 29, 1997, now U.S. Pat. No. 5,820,655 and also incorporated herein by reference. Both applications are commonly owned with the present application.

The oxygen depleted retentate 54, FIG. 2, contains between 6% and 12%, by volume, of residual oxygen and may be discharged 70 after rejecting heat to recuperative heat exchanger 66, or alternatively, a portion 70', or all, of the oxygen depleted retentate is expanded in turbine 62 to recover power.

Since the oxygen depleted retentate 54 contains some residual oxygen, a combustor 56 may be inserted upstream of turbine 62 and the oxygen depleted retentate reacted with second gaseous fuel 58 to raise the turbine 62 inlet temperature to between 1100° C. and 1500° C. thus increasing both the power generated and the thermal efficiency of the system.

In the absence of combustor 56 or if expanded stream 60 is at too low a temperature, the energy required to sustain operation of the integrated system illustrated in the FIG. 2 is provided by the heat generated in the solid oxide fuel cell 10. The amount of heat generated depends on the efficiency of the solid oxide fuel cell 10 in converting chemical energy to electrical energy. This efficiency, in turn, dictates the portion 70' of the oxygen depleted retentate stream 54 that may be expanded in the turbine 62 since, if the heat generated by the solid oxide fuel cell 10 is inadequate, a larger portion of the heat contained within stream 54 must be used in recuperative heat exchanger 66 to preheat the oxygen-containing gas feed 28 and gaseous fuel 30.

In an alternative embodiment, the recuperative heat exchanger 66 is replaced by a combustor (not shown) that is positioned upstream of the solid oxide fuel cell 10 to preheat the oxygen-containing gas feed 28 and gaseous fuel 30.

Figure 3:
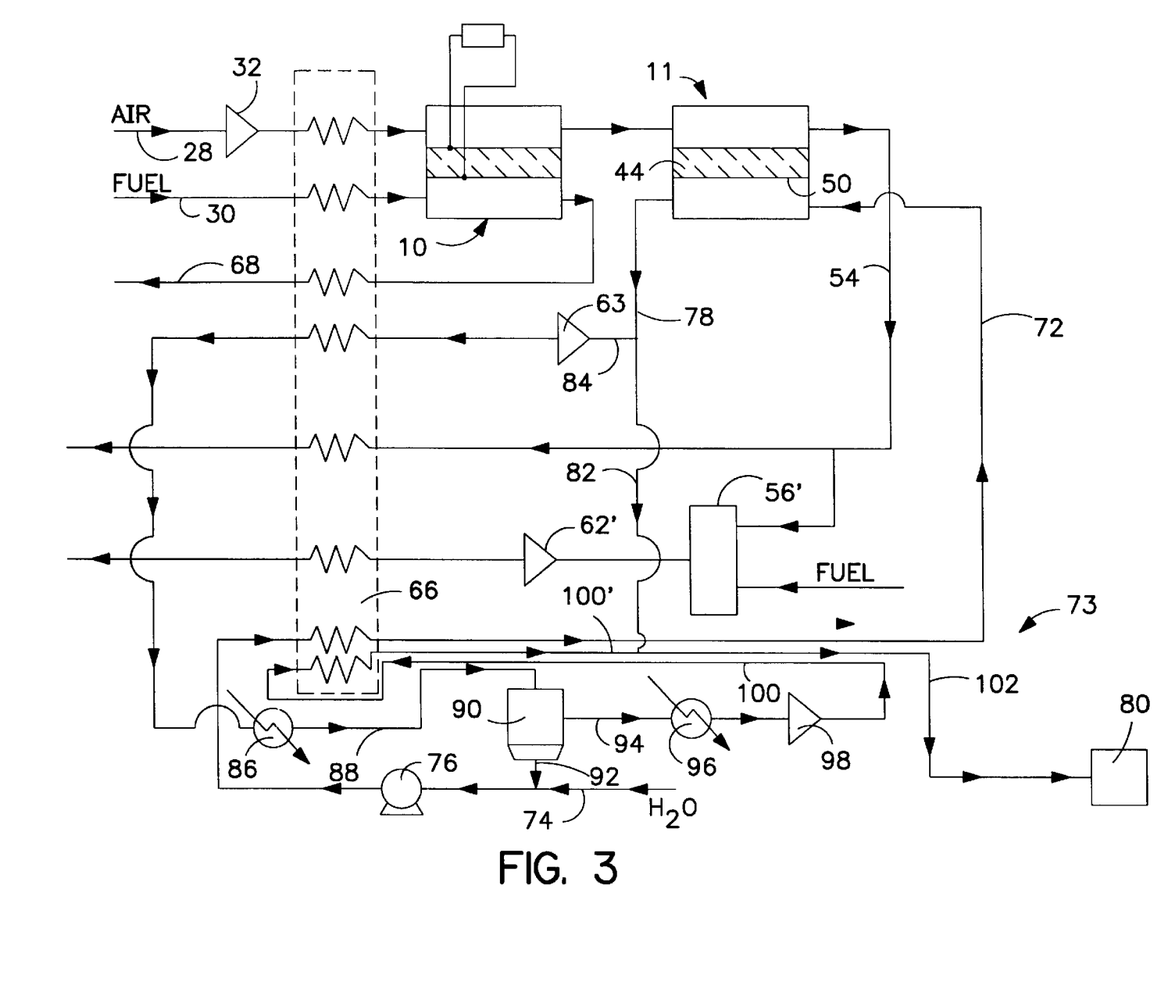
FIG. 3 schematically illustrates an integrated system for the co-production of power and a mixture of oxygen and steam useful in a coal gasifier.

FIG. 3 schematically illustrates an application of the integrated system that provides both oxygen and steam to a coal gasifier. As disclosed in co-pending, commonly owned, U.S. patent application Ser. No. 08/972,412 (D-20,365) that was filed on Nov. 18, 1997, coal gasifiers require both steam and oxygen, typically at a molar ratio of about 1:2 and at elevated pressure.

In this embodiment, air stream 28, fuel stream 30, and combustion products stream 68 from fuel cell 10 are similar to those of FIG. 2. Retentate stream 54 of module 11, FIG. 3, is passed directly through heat exchanger 66 and/or through combustor 56' and turbine 62'. The second anode side 50 of module 11 is swept with steam 72 to enhance oxygen transport through the oxygen selective ion transport membrane 44 by lowering the average oxygen partial pressure on the second anode side 50. The advantages of steam sweeping are discussed in co-pending, commonly owned, U.S. patent application Ser. No. 08/972,020 (Attorney's Docket No. D-20,345) that was filed on Nov. 18, 1997, now U.S. Pat. No. 5,954,559 and which is also incorporated by reference in its entirety herein.

The steam 72 is a part of a process loop 73 integrated into the fuel cell/ion transport module system. Feed water 74 is pumped to a required pressure, typically on the order of 150 to 600 psi, by pump 76 and then evaporated and superheated, such as in recuperative heat exchanger 66, to produce the steam 72. Permeate stream 78 contains a mixture of residual oxygen and steam. Stream 78, in a first embodiment, is directly injected into a coal gasifier 80 (shown as stream 102, but without the addition of stream 100', described below).

In a second embodiment, the stream 78 is divided into a first portion 82 injected into coal gasifier 80 and a second portion 84 that is expanded in turbine 63, cooled and delivered to a condenser 86. Most of the steam is condensed in condenser 86 and the condenser output 88 is a mixture of liquid water and water saturated oxygen. The water is separated from the mixture in a separator 90 and recycled water 92 is mixed with make up feed water 74.

Water saturated oxygen 94 removed from separator 90 is cooled in a cooler 96 and compressed in compressor 98. The compressed stream 100 is reheated, such as by passing through recuperative heat exchanger 66 as heated stream 100' and then blended with the first permeate stream portion 82 to produce stream 102. By controlling the proportion of first portion 82 and compressed stream 100 to make up stream 102, the desired steam to oxygen ratio for coal gasifier 80 is obtained.

Advantages of the system schematically illustrated in FIG. 3 over a separate generation and injection of steam and oxygen to a coal gasifier include a reduction in required ion transport membrane area and savings in the power required to compress oxygen. By blending a stream containing steam and oxygen with a second, high oxygen content stream, better control of the steam to oxygen ratio is achieved. Using steam as a sweep gas permits operating the cathode sides of the fuel cell ion transport reactor at pressures lower than gasifier pressure while saving oxygen compression power.

Alternatively, a condenser (not shown) may be used to remove water from output 78 to obtain a lower steam to oxygen ratio. This alternative, however, wastes much of the energy contained within that portion of the output 78 that is condensed reducing the efficiency of the system.

Figure 4:
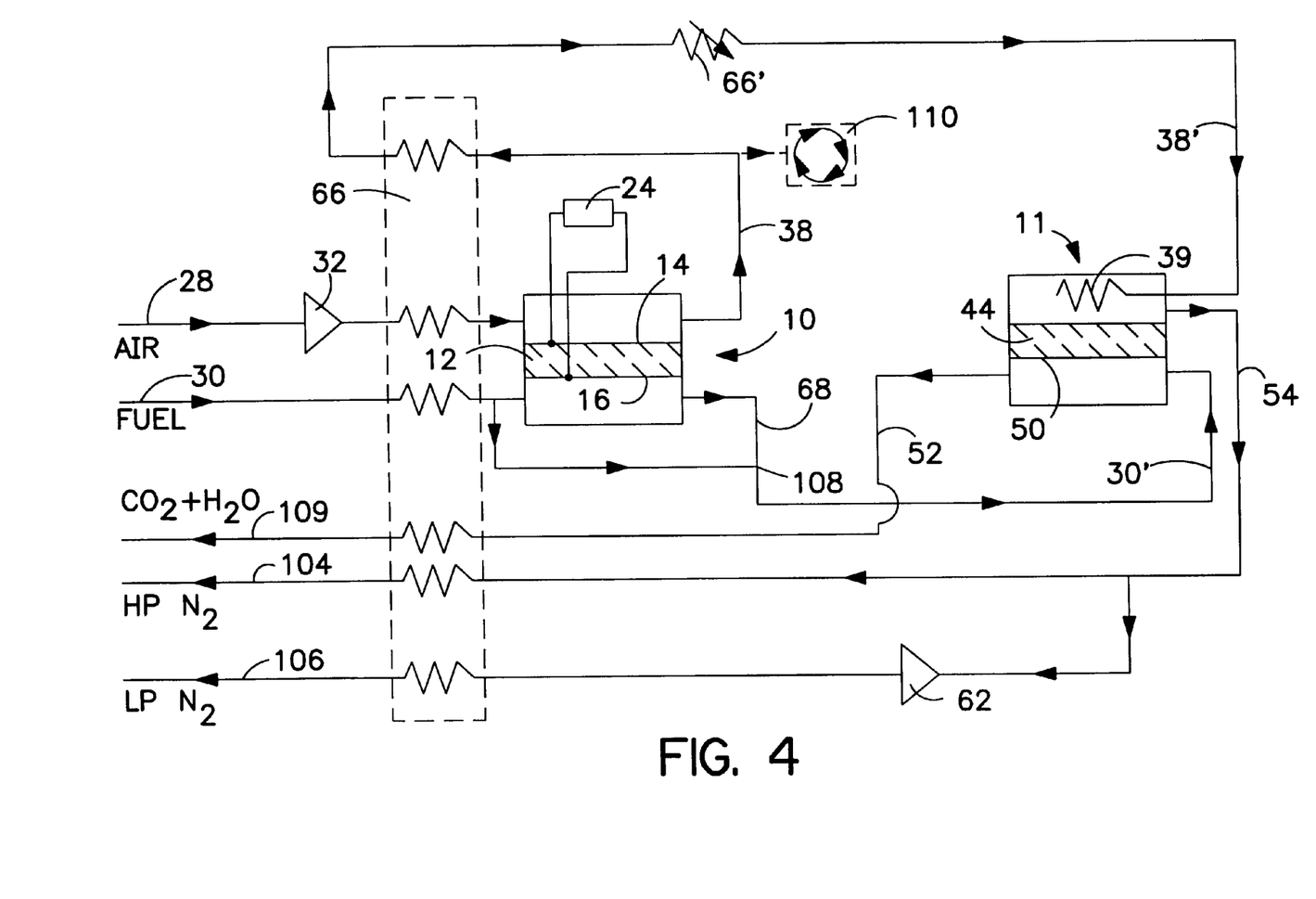
FIG. 4 schematically illustrates an integrated system for the co-production of power and nitrogen.

FIG. 4 schematically illustrates an integrated system having a solid oxide fuel cell 10 and a first ion transport reactor 11 useful for the co-production of power and nitrogen. Oxygen-containing feed gas 28, typically air, is compressed by compressor 32 to a pressure of between about 45 and 165 psia. The compressed air is then heated, such as by recuperative heat exchanger 66 to a temperature of between about 200° C. and 700° C. and introduced to the first cathode side 14 of fuel cell 10. Approximately 60% to 70%, by volume, of the oxygen contained within the oxygen-containing gas feed 28 is transported through ceramic membrane 12 and exothermally reacts with the gaseous fuel 30. By maintaining a relatively high pressure on the first cathode side 14, a relatively high oxygen partial pressure is maintained enabling a significant volume fraction of the oxygen to be transported through the ceramic membrane 12 and thus obtaining reasonable conversion efficiency. Due to the significant exothermic reactions occurring at the first anode side 16, additional cooling may be required to avoid an excessive temperature rise.

The retentate 38 having reduced oxygen content is delivered to the first ion transport reactor 11 to complete removal of oxygen from the cathode side stream. The oxygen is transported through the oxygen selective ion transport membrane 44 and exothermally reacts with gaseous fuel 30' at the second anode side 50. The heat from this exothermic reaction is absorbed within a heater section 39 by temperature rise of the cathode side feed stream 38' which as stream 38 was cooled in heat exchanger 66 or in optional cooler 66'. Stream 54 retentate contains less than about 10 ppm of oxygen and can be delivered at pressure as a high pressure nitrogen product 104 after the removal of useful heat by recuperative heat exchanger 66. Alternatively, at least a portion of the oxygen depleted stream 54 is expanded in turbine 62 and recovered as a low pressure nitrogen product 106.

A first portion of the gaseous fuel 30 is delivered to the first anode side 16 of the solid oxide fuel cell 10. A second portion 30' of the gaseous fuel 30 can be delivered directly to the second anode side 50 of the first ion transport reactor 11. Preferably, the combustion products 68 serve as a diluent and are combined at junction 108 with the second portion 30' of the gaseous fuel 30 gas to purge the second anode side 50. Most preferably, all gaseous fuel 30 passes through the first anode side 16 to increase the average fuel partial pressure at the solid oxide fuel cell 10 anode and thereby maximize the efficiency of the fuel cell since a high fuel partial pressure will enhance the reaction kinetics on the fuel cell anode and thereby minimize polarization losses.

The permeate gas 52 is substantially water vapor and carbon dioxide, since nitrogen is excluded from the anode side reactions, except for trace amounts contained within the fuel. If desired, a carbon dioxide product 109 may be recovered after condensing out the water.

The system illustrated schematically in FIG. 4 generates a significant excess of heat because all the oxygen contained in the oxygen-containing gas feed 28 is exothermally reacted with gaseous fuel 30. In small systems, this heat may be used to generate steam to export from the system. In larger systems, the excess heat may be utilized to produce additional power through a Rankine cycle 110, shown in phantom. In a Rankine cycle, the excess heat is directed to a boiler where the heat changes the water into superheated steam. Expansion of steam to a lower pressure vapor drives a turbine to generate shaft power. Heat is then removed in a condenser as the steam is converted back to a saturated liquid low pressure. A pump then returns the pressure to the boiler pressure. Heat for the Rankine cycle 110 is preferably removed from streams 38 and/or 54.

Figure 5:
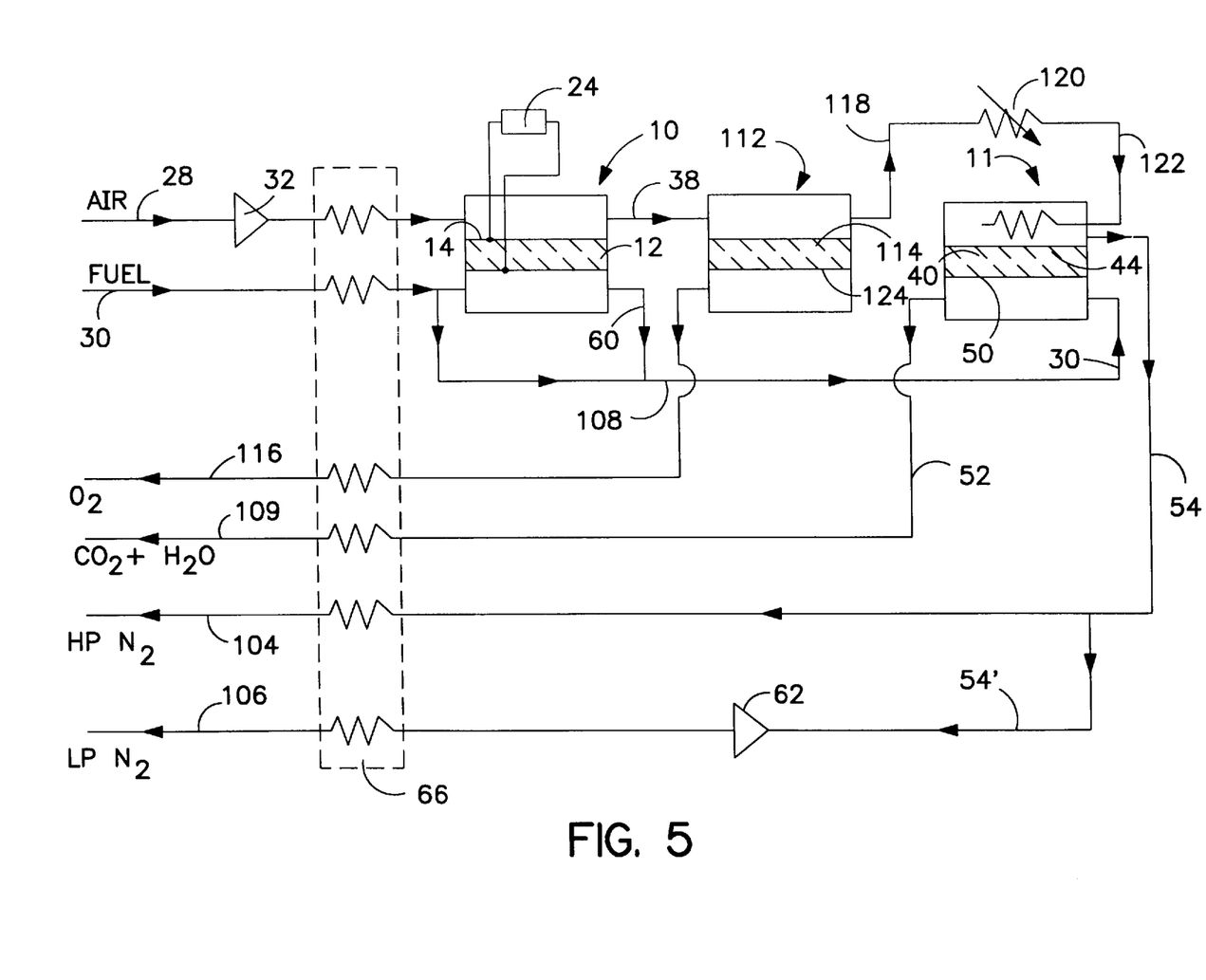
FIG. 5 schematically illustrates an integrated system for the co-production of power, oxygen and nitrogen.

FIG. 5 illustrates a system for the co-generation of nitrogen and oxygen. A second ion transport reactor 112 is disposed between the solid oxide fuel cell 10 and the first ion transport reactor 11. An oxygen-containing gas feed 28, typically air, is compressed to a pressure of between 100 psia and 300 psia by a compressor 32 and heated, such as by recuperative heat exchanger 66, to a temperature of between about 300° C. and about 800° C. The heated oxygen-containing gas feed 28 is delivered to the first cathode side 14. Approximately 20% to 25%, by volume, of the oxygen contained within the oxygen-containing gas feed 28 is transported through the ceramic membrane 12 to exothermally react with gaseous fuel 30 generating electrical power delivered to load 24 and heat. The heat is effective to raise the temperature of the partially oxygen depleted retentate stream 38 to a temperature in the range of from about 900° C. to about 1,000° C.

The partially depleted oxygen gas stream 38 is now at an effective temperature for oxygen separation in the second ion transport reactor 112 and approximately 40% to 60% of the remaining oxygen is transported through a oxygen selective ion transport membrane 114 and recovered as oxygen product 116. A low oxygen-containing retentate stream 118 discharged from the second ion transport reactor 112 rejects heat to heat exchanger 120. The rejected heat can be used for an external Rankine power cycle, delivered to recuperative heat exchanger 66 to make up thermal deficiencies in other parts of the system, or discharged as waste. A reduced temperature, typically on the order of 300 to 700° C., low oxygen content stream 122 is introduced to the second cathode side 40 of the first ion transport reactor 11. Typically, the oxygen content in the feed gas to the cathode side 40 of the first ion transport reactor 11 will be between 2% and 7%, by volume, depending on whether a sweep gas (a suitable source could be stream 52 consisting of products of combustion) is introduced to the third anode side 124 of the second ion transport reactor 112 to reduce the oxygen partial pressure at the third anode side, thereby increasing the driving force for oxygen transport through the oxygen selective ion transport membrane 114. The lower value is achieved if a sweep gas is used. The remaining oxygen is transported through the oxygen selective ion transport membrane 44 and exothermally reacted with either gaseous fuel 30, or a mixture of fuel and combustion product 60 where all fuel is introduced to the anode of fuel cell 10, at the anode side 50 of the first ion transport reactor 11. The retentate from cathode side 40, oxygen depleted gas stream 54, typically has an oxygen content of less than 10 parts per million.

As described above, the oxygen depleted gas stream 54 may be recovered as a high pressure nitrogen product 104, as low pressure nitrogen product 106 after stream 54' is expanded in power producing gas turbine 62, or a combination thereof.

Product gas 52 from the second anode side 50 may be cooled to recover carbon dioxide 109 and water vapor. Alternatively, the product gas 52 may be delivered to the anode side 124 of the second ion transport reactor 112, in which case the permeate stream 116 contains a mixture of carbon dioxide, oxygen and water vapor. If the water vapor is removed, such as by condensation, the gas will contain about 75% to 92% oxygen by volume. Pure oxygen is obtained, after separation and recovery of the carbon dioxide and additional drying.

The advantages of the invention described herein above will become more apparent from the examples that follow:

EXAMPLE 1

Figure 6:
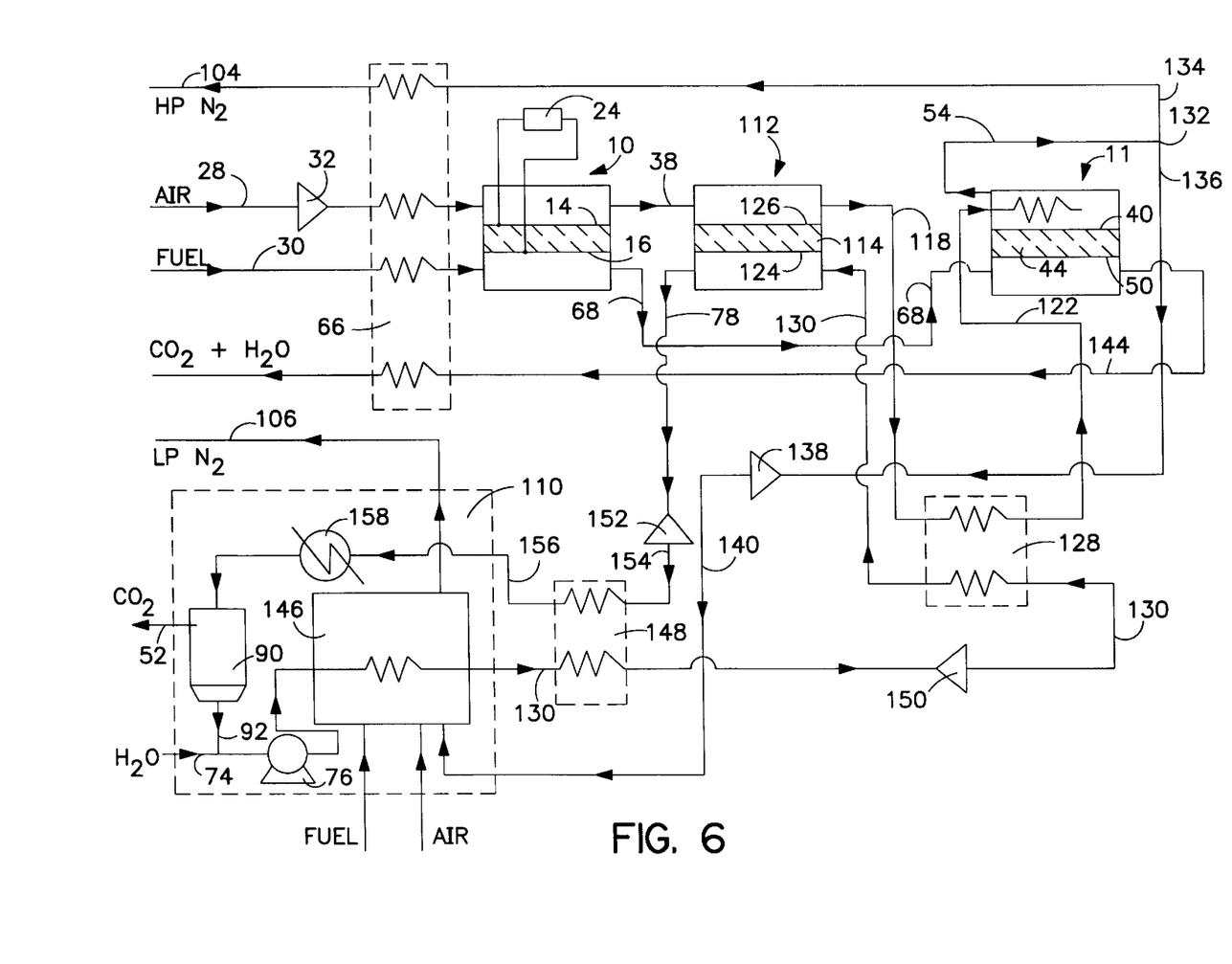
FIG. 6 schematically illustrates another integrated system for the co-production of electric power, oxygen and nitrogen.

FIG. 6 schematically illustrates a system that integrates a solid oxide fuel cell 10, a first ion transport reactor 11 and a second ion transport reactor 112 to co-produce electric power for load 24, oxygen as product gas 52 and high pressure nitrogen 104 and low pressure nitrogen 106. The nitrogen product streams are proportioned so that the power produced by gas turbine 138 is just sufficient to drive air compressor 32.

An oxygen-containing gas feed 28, air, is compressed by compressor 32 to a pressure of about 155 psia and after having been preheated in recuperative heat exchanger 66 is delivered to the first cathode side 14 and where it is further heated to a temperature of about 950° C. due to heat generated by the exothermic reactions occurring at the first anode side 16. The solid oxide fuel cell 10 generates electric power that is withdrawn and after conditioning delivered to the load 24, such as an external power grid. The oxygen content of the partially depleted oxygen gas stream 38 is approximately 15%, by volume.

Stream 38 is delivered to the third cathode side 126 of the second ion transport reactor 112. Oxygen corresponding to 12% of that contained in the feed air is transported through the second oxygen selective ion transport membrane 114 such that the oxygen content of retentate stream 118 contains about 6% oxygen, by volume. Stream 118 is at an elevated temperature and rejects heat in a first superheater 128 to steam stream 130. Stream 122, now at reduced temperature, is introduced to the second cathode side 40 where the residual contained oxygen is removed by a reactive purge gas stream 68, typically consisting of fuel and combustion products coming from the first anode side 16, of the first ion transport reactor 11.

The oxygen depleted stream 54, now a high purity nitrogen stream, is split or divided at junction 132 into a first stream 134 which is recovered as high pressure nitrogen product 104 and a second stream 136 which is expanded in turbine 138 which drives the compressor 32. The split between streams 136 and 134 is proportioned such that the power delivered by turbine 138 satisfies the requirements of the compressor 32 when the turbine and compressor are mechanically coupled. The flow in excess of that required is recovered as high pressure nitrogen product 104. Waste heat from the expanded second stream 140 is recovered by the Rankine cycle 110 before discharge from the system as low pressure nitrogen stream 106.

The gaseous fuel 30 is heated in recuperative heat exchanger 66 and delivered to the first anode side 16. At the first anode side 16, the gaseous fuel 30 reacts exothermally with transported oxygen to produce electric power and heat. The permeate stream 68 exiting the first anode side 16 contains excess unburned fuel and combustion products and is introduced to the second anode side 50 of the first ion transport reactor 11 to serve as the reactive purge stream for removal of residual oxygen from the partially oxygen depleted gas feed 122. The permeate 144 from the second anode side contains primarily the products of combustion (carbon dioxide and water vapor) and is discharged after recovery of useful heat in recuperative heat exchanger 66.

Alternatively, the gaseous fuel 30 is compressed by a conventional element (not shown) and the first anode side 16 and the second anode side 50 are then operated at about the same pressure as the first and second 40 cathode sides 14 and 40. If this is done, the anode side products of combustion can be delivered at pressure for enhanced downstream recovery of carbon dioxide or, if carbon dioxide co-product is not desired, added to the second high pressure nitrogen stream 136 and expanded. This will permit recovery of additional high pressure nitrogen as product 104 or the export of additional power.

The third anode side 124 is purged by a sweep gas (steam in this construction) generated by pumping feed water 74 by pump 76 to a pressure of about 1,000 psia and delivering it to a boiler/heater 146 that converts it to steam 130. The steam is then superheated in a second superheater 148 to a temperature that is sufficient to avoid moisture condensation during subsequent expansion to a pressure of about 150 psia in high pressure turbine 150.

The expanded steam 130 is reheated in first superheater 128 and used to purge the third anode side 124. This improves oxygen recovery and increases the driving force for oxygen transport. Such an application for a steam circuit is more fully disclosed in co-pending, commonly owned, U.S. patent application Ser. No. 08/972,020 (Attorney's Docket No. D-20,345) that was incorporated by reference hereinabove.

Stream 78 has a partial pressure of oxygen of about 20 psia and is delivered to a low pressure steam turbine 152 at a pressure of about 150 psia. The expanded output 154, now at a pressure of 16 psia, is then cooled in the second superheater 148 providing the heat required to superheat steam 130. The cooled, expanded output stream 156 enters condenser 158 where a major portion of the contained water condenses, permitting recovery of the oxygen as product gas 52 from separator 90. Recycled water 92 may be combined with the feed water for return to pump 76 and thereby returned to a pressure of 1,000 psia to complete the steam circuit.

Table 1 identifies the inputs utilized to model the system illustrated in FIG. 6.

TABLE 1

| PARAMETER | VALUE | FIGURE 6, REF. NUMERAL |
|---|---|---|
| Air Flow | 8.33 MMNCFH | 28 |
| Air Compressor Discharge Pressure | 155 psia (4 Compression Stages) | 32 |

TABLE 1-continued

| PARAMETER | VALUE | FIGURE 6, REF. NUMERAL |
|---|---|---|
| Air Compressor Efficiency | 85% adiabatic | 32 |
| SOFC temperature | 950° C. | 10 |
| SOFC Efficiency | 60% | 10 |
| Hot Gas Turbine Inlet Pressure | 150 psia | 138 |
| Hot Gas Turbine Inlet Temperature | 950° C. | 138 |
| Hot Gas Turbine Exhaust Pressure | 16 psia | 138 |
| High Pressure Steam Turbine Inlet Pressure | 1,000 psia | 150 |
| High Pressure Steam Turbine Inlet Temperature | 430° C. | 150 |
| Low Pressure Turbine Inlet Pressure | 150 psia | 152 |
| Low Pressure Steam Turbine Inlet Temperature | 900° C. | 152 |
| Low Pressure Steam Turbine Exhaust Pressure | 16 psia | 152 |
| Steam Condensing Pressure | 14.7 psia | 158 |
| Steam Generated | 303 M lbs./hr. | 130 |

The calculated results for the system are tabulated in Table 2.

TABLE 2

| PARAMETERS | VALUE | FIGURE 6, REF. NUMERAL |
|---|---|---|
| Oxygen Product at 1 atm. | 1,000 MNCFH 57% Rec. of O₂ in Air | 52 |
| Nitrogen Product at 9.86 atm. | 2,990 MNCFH | 104 |
| Net Power Generated | 98,100 KW | 36 |
| Heat Required | 711 MM BTU/Hr. | For System |
| Heat Rate | 7,247 BTU/KW Hr. | For System |
| Heat Rate with Credit for N2 Compression | 6,766 BTU/KW Hr. | 66 |
| Heat Rate with Add. Credit for Sep. at 7 KW/1,000 NCFH O2 | 6,344 BTU/KW Hr. | 112 |

The Table 2 results display a very attractive performance potential in terms of the heat rates realized notwithstanding the relatively modest peak temperatures employed in the cycle while obtaining respectable oxygen recoveries in comparison to conventional systems. As further benefit, a significant fraction of the nitrogen contained in the air is delivered at pressure.

EXAMPLE 2

Figure 7:
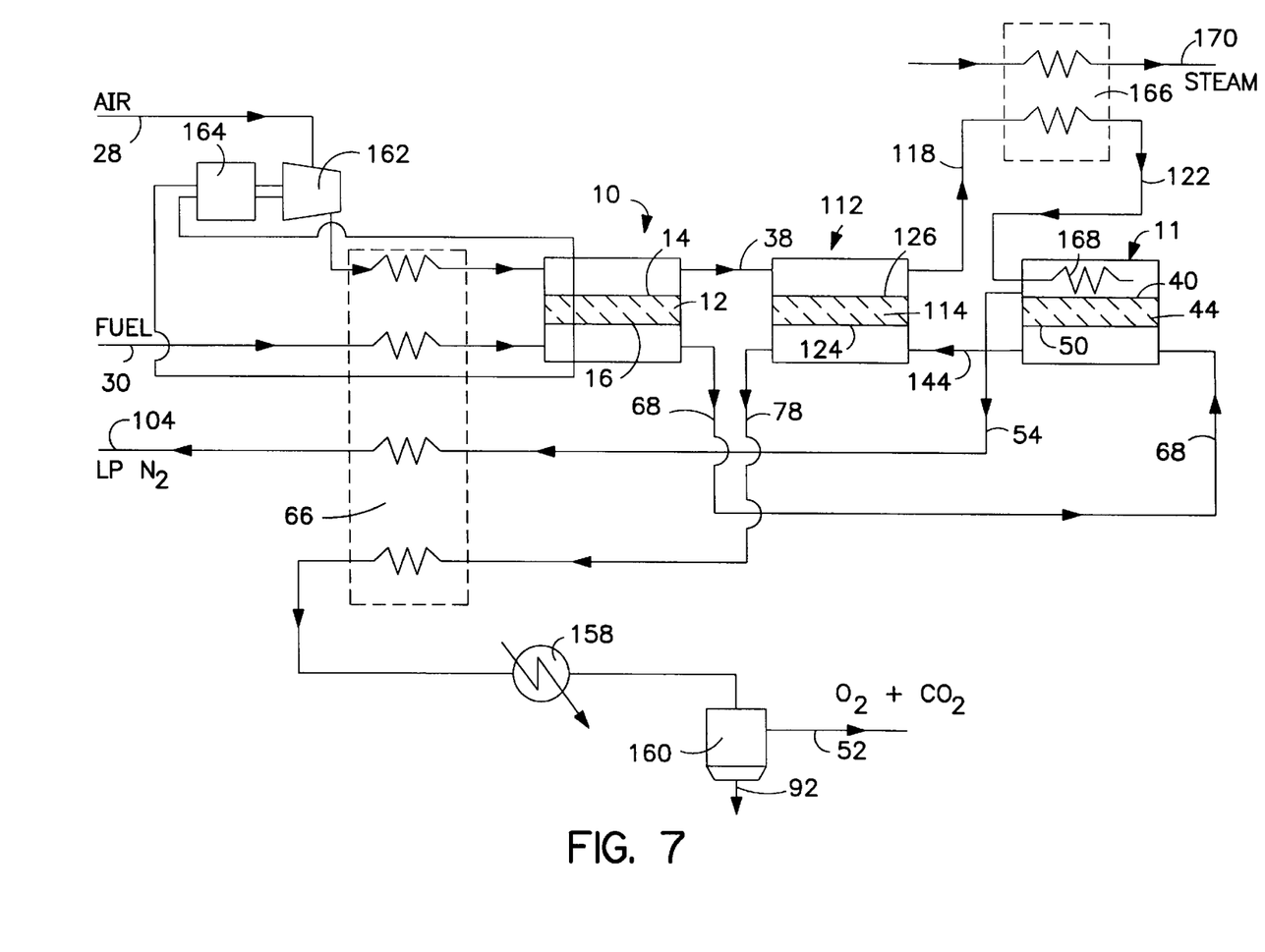
FIG. 7 schematically illustrates an integrated system for the production of essentially oxygen-free nitrogen.

FIG. 7 schematically represents another integrated system in accordance with the invention. This system is particularly effective for the production of essentially oxygen-free nitrogen with the option for the co-production of oxygen and carbon dioxide. Utilizing the parameters presented in Table 3 below, the solid oxide fuel cell 10 is sized to deliver sufficient power to drive the air compressor 162.

An oxygen-containing gas feed 28, preferably air, is compressed by air compressor 162 to a pressure of about 155 psia. The compressed air is then preheated, such as by recuperative heat exchanger 66, to a temperature of about 800° C. and introduced to the first cathode side 14 of the solid oxide fuel cell. Gaseous fuel 30 is introduced to the first anode side 16 and exothermally reacted with oxygen ions transported through the ceramic membrane 12 generating heat, electricity and anode side stream 68 that is a mixture of combustion products and gaseous fuel. The electric power generated is utilized to drive an electric motor 164 that drives the air compressor 162.

The partially oxygen depleted retentate stream 38 exiting the solid oxide fuel cell 10 is at a temperature of about 950° C. About 12%, by volume, of the oxygen contained in the air is consumed by the reaction with the gaseous fuel 30 at the first anode side 16. Partially oxygen depleted stream 38 is conducted to the third cathode side 126 of the second ion transport reactor 112 where about 60%, by volume, of the remaining oxygen is transported through the second oxygen selective ion transport membrane 114. To enhance the removal and potential recovery of a significant fraction of the oxygen contained within the stream 38, the third anode side 124 is swept with the combustion products of either the first anode side 16, the second anode side 50 or the combination of both. The sweep gas reduces the oxygen partial pressure at the third anode side 124 to increase oxygen recovery and or the driving potential for oxygen transfer.

Retentate stream 118 from the third cathode side 126 contains about 6%, by volume, of oxygen. Stream 118 is cooled in heat exchanger 166 producing a reduced temperature stream 122 to function as a heat sink 168 to absorb the heat of reaction generated downstream in first iron transport reactor 11. The heat rejected from the low oxygen content retentate stream 118 in heat exchanger 166 can be used to raise steam 170 for export or other uses.

The reduced temperature stream 122 is delivered to the second cathode side 40 where the remainder of the contained oxygen is transported through the oxygen selective ion transport membrane 44 and reacts with the gaseous fuel contained within the gaseous fuel/combustion products mixture 68 at the second anode side 50. The oxygen depleted gas stream 54 removed from the second cathode side 40 contains less than 10 ppm oxygen and can be delivered, after recovery of useful heat, as a high pressure nitrogen product 104. The gaseous fuel 30 is preheated in recuperative heat exchanger 66 and delivered to the first anode side 16 and reacts with oxygen transported through ceramic membrane 12 from the first cathode side 14. Since the gaseous fuel 30 contains also the fuel required in the first oxygen transport reactor 11, the average partial pressure of the gaseous fuel in the solid oxide fuel cell 10 is elevated to enhance efficiency. The exiting permeate stream 68 contains gaseous fuel diluted by the products of combustion and enters the second anode side 50 of the first ion transport reactor 11 to remove oxygen transported through the ceramic membrane 44 from the second cathode side 40 by a reactive purge. The exiting permeate stream 144 contains combustion products, a mixture of water vapor and carbon dioxide, and is useful as a sweep gas to purge the third anode side 124 of the second ion transport reactor 112. Permeate stream 78 exiting from the second ion transport reactor 112 contains a mixture of combustion products and oxygen. Following the recovery of useful waste heat in recuperative heat exchanger 66, condenser 158 and separator 160 are utilized to recover a low purity oxygen product gas 52 that contains about 75%, by volume, of oxygen with the bulk of the impurities being carbon dioxide. If required, the carbon dioxide could be removed by a downstream process and the oxygen recovered. Recycled water 92 is appropriately discharged. If the oxygen or carbon dioxide are not desired, stream 78 may also be discarded after recovery of useful heat in recuperator 66.

Table 3 identifies the input parameters for the system schematically illustrated in FIG. 7.

TABLE 3

| PARAMETER | VALUE | FIGURE 6, REF. NUMERAL |
|---|---|---|
| Air Flow | 126,000 NCFH | 28 |
| Compressor Discharge Pressure | 150 psia | 162 |
| No of compression stages | 3 | 162 |
| Adiabatic Compressor Efficiency | 85% | 162 |
| SOFC Efficiency | 60% | 10 |
| SOFC Operating Temperature | 950° C. | 10 |

The results of the calculations utilizing the inputs of Table 3 are tabulated in Table 4.

TABLE 4

| PARAMETERS | VALUE | FIGURE 7, REF. NUMERAL |
|---|---|---|
| Nitrogen Product at <10 ppm O2 | 100,000 NCFH | 104 |
| Nitrogen Product Pressure | 140 psia | 104 |
| Nitrogen Recovery | 100% | 104 |
| Potential Oxygen Byproduct | 16,120 NCFH contained at 75.9% Purity | 52 |
| Byproduct Pressure | 14.7 psia | 52 |
| Oxygen Recovery | 61% | 52 |
| Potential Stream for Export | 2,900 Lbs./Hr. | 170 |
| Required Fuel | 5,100 NCFH of Natural Gas | 30 |

An advantage of the system illustrated in FIG. 7 is that the efficiency is enhanced by the availability of fuel diluent, in the form of combustion products from the solid oxide fuel cell 10, and the first ion transport reactor 11 to purge the second ion transport reactor 112. This enables high recovery rates of both nitrogen and oxygen. A nonintegrated (separate fuel cell powering the compressor or an independent ion transport membrane) separation system would be burdened by additional capital expenditure for the separate air and fuel circuits, the capital and energy penalties due to a larger fuel cell which is required to supply the air compression power for both systems and greater energy penalties due to cold end temperature differential losses, likely resulting in less efficient fuel utilization.

The specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. A process for the generation of electric power and a product gas stream from a mixture of an oxygen-containing stream gas and a first gaseous fuel stream, comprising:

(a) providing a solid oxide fuel cell having a first cathode side and a first anode side;

(b) providing a first ion transport reactor having an oxygen-selective ion transport membrane disposed therein, said oxygen-selective ion transport membrane having a second cathode side and a second anode side;

(c) contacting said oxygen-containing gas stream with said first cathode side and contacting said first gaseous fuel stream with said first anode side;

(d) transporting a first oxygen portion of said oxygen-containing gas stream from said first cathode side to said first anode side;

(e) reacting said first oxygen portion with said first gaseous fuel stream at said first anode side and generating a flow of electrons from said first anode side to said first cathode side;

(f) recovering said flow of electrons as electric power;

(g) directing a remainder of said oxygen-containing gas stream as a first retentate stream from said first cathode side to said second cathode side;

(h) contacting said first retentate stream with said second cathode side and transporting a second oxygen portion from said second cathode side to said second anode side; and (i) recovering a gas stream as said product gas stream from at least one of said first cathode side, said first anode side, said second cathode side and said second anode side.

2. The process of claim 1 wherein said oxygen-containing gas stream includes air.

3. The process of claim 2 further including compressing said air prior to contacting said first cathode side.

4. The process of claim 3 further including recovering oxygen as said product gas stream from said second anode side.

5. The process of claim 4 further including reacting a retentate gas stream exiting from said second cathode side with a second gaseous fuel stream to generate combustion products.

6. The process of claim 5 wherein said combustion products are utilized to drive a turbine.

7. The process of claim 2 wherein a recuperative heat exchanger transfers heat from at least one stream, after contact of said stream with at least one of said first and second cathode and anode sides, to said air and to said first gaseous fuel stream upstream of said solid oxide fuel cell.

8. The process of claim 2 further including sweeping said second anode side with steam at an elevated pressure whereby a permeate gas stream exiting from said second anode side contains a mixture of steam and oxygen.

9. The process of claim 8 further including adjusting the ratio of steam to oxygen in said permeate gas stream from said second anode side to a molar ratio effective for coal gasification.

10. The process of claim 9 wherein said adjusting step comprises dividing said permeate gas stream from said second anode side into a first portion and a second portion, cooling said second portion, condensing out water from said second portion, compressing remaining gas from said second portion back to the pressure of said permeate gas stream and then recombining said first portion and said second portion.

11. The process of claim 10 wherein said cooling of said second portion includes expanding it in a turbine prior to additional cooling and condensing out the water therefrom.

12. The process of claim 2 further including sweeping said second anode side with a reactive purge gas stream selected from the group consisting of the unreacted portion of said first fuel gas, combustion products from said first anode side, and mixtures thereof.

13. The process of claim 12 wherein nitrogen is recovered as said product gas stream from said second cathode side.

14. The process of claim 13 including the additional step of expanding at least a portion of said nitrogen in a turbine.

15. The process of claim 12 wherein carbon dioxide is recovered from a permeate gas stream from said second anode side.

16. The process of claim 12 further including recovering excess heat from exothermic reactions at said first anode side, said second anode side, or a combination thereof to drive an integrated Rankine cycle.

17. The process of claim 2 wherein a second ion transport reactor having a third cathode side and a third anode side is disposed between said solid oxide fuel cell and said first ion transport reactor such that said first retentate stream exiting from said first cathode side is contacted with said third cathode side before it is contacted with said second cathode side.

18. The process of claim 17 wherein a permeate stream from said first anode side is contacted with said second anode side without first contacting it with said third anode side.

19. The process of claim 17 wherein a low oxygen content nitrogen gas is recovered as said product gas stream from said second cathode side.

20. The process of claim 19 wherein heat from exothermic reactions at one or more of said first, second, and third respective anode sides provides heat to drive a Rankine cycle, and said Rankine cycle generates compressed steam that is used to sweep said third anode side and enhance oxygen production.

21. The process of claim 17 wherein carbon dioxide is recovered as said product gas stream from a permeate stream from said second anode side.

22. The process of claim 17 wherein oxygen is recovered as said product gas stream from said third anode side.

* * * * *